Oct. 8, 1940.   E. ROSS   2,217,183
FILM DRIVING MECHANISM
Original Filed May 26, 1936   2 Sheets-Sheet 1

Inventor
ERNEST ROSS
By Vrl R. Goshow
Attorney

Oct. 8, 1940.  E. ROSS  2,217,183
FILM DRIVING MECHANISM
Original Filed May 26, 1936  2 Sheets-Sheet 2

Inventor
ERNEST ROSS

Attorney

Patented Oct. 8, 1940

2,217,183

UNITED STATES PATENT OFFICE 2,217,183

FILM DRIVING MECHANISM

Ernest Ross, North Chili, N. Y., assignor to Radio Corporation of America, a corporation of Delaware Original application May 26, 1936, Serial No. 81,881. Divided and this application April 7, 1938, Serial No. 200,648

6 Claims. (Cl. 242—55)

This invention relates to the art of printing motion picture sound film and has particular reference to a reversible drive system wherein positive and negative films may be driven in either direction. This application is a division of my co-pending application Serial No. 81,881, filed May 26, 1936, in which the printer itself, such as the optical systems for transferring the images from the negative to the positive film and the general assembly, is described in detail. The present application discloses the reversible clutch mechanism which permits any film reel to act either as a takeup or supply reel.

In certain types of film printers, such as disclosed in the parent application, it is frequently desirable to run the film either forward or backward through the printer. To accomplish this result, the function of the takeup and supply reels for each respective film must be interchanged so that for a definite period certain reels function as takeups and the others, as supply reels; and at other periods the former supply reels function as takeups and the former takeups, as supply reels. A feature of the invention is that the reels automatically perform their respective functions in accordance with the direction of rotation of the driving mechanism. That is, it is only necessary to reverse the printer so that the sprockets and other elements drive the film in the reverse direction to cause the reels to reverse their function.

An object of the invention, therefore, is to automatically change the function of each film reel when the printer is reversed to obviate the necessity of rewinding a printing film at the end of each printing operation.

Another object of the invention is to utilize the variable takeup elements of the reel mechanism as a drag during the times when the reel is functioning as a supply reel to prevent overrunning of the reel.

The details of the invention and the method of its operation will be fully understood by reference to the following specification read in conjunction with the accompanying drawings, in which.

Figure 1:
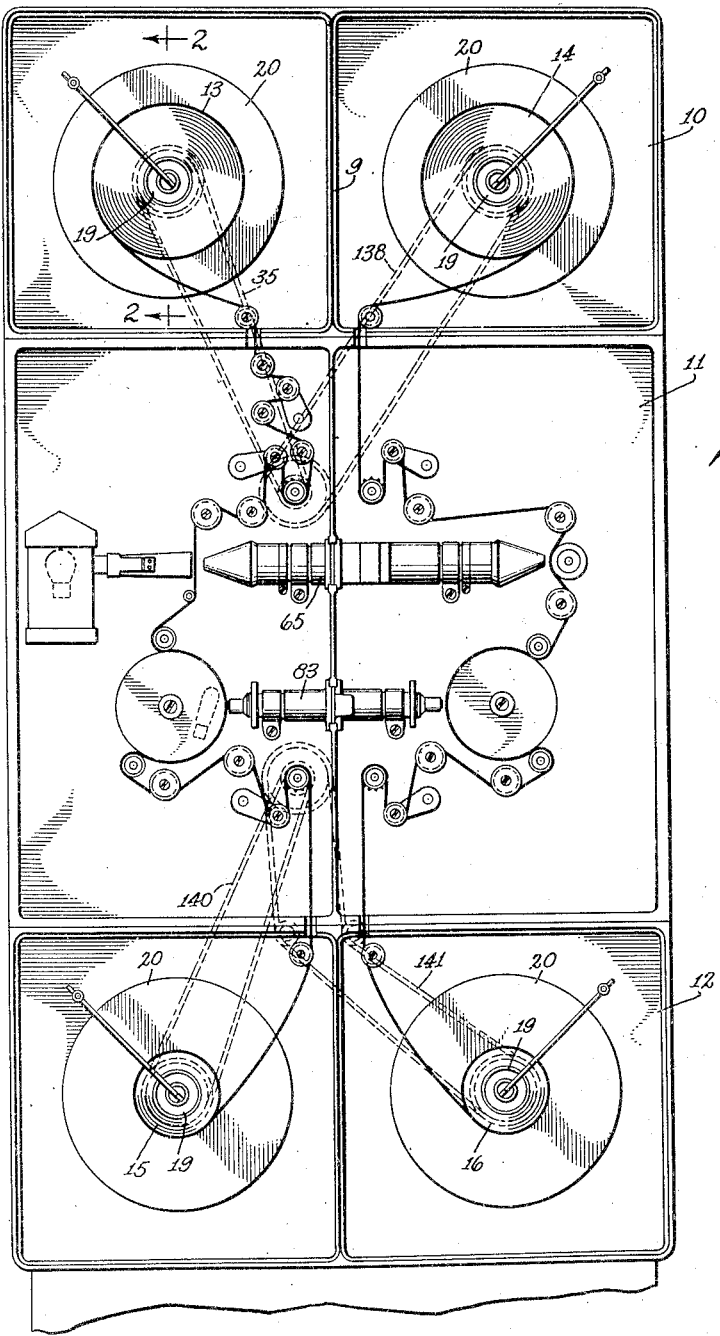
Figure 1 is a front elevational view of a printer embodying the present invention.

Referring now to Fig. 1, the printer is shown as comprising three main compartments, an upper film magazine compartment 10, a film printing compartment 11 and a lower film magazine compartment 12. Each of these three compartments may be provided with covers or doors to permit operation of the printer without necessitating the placing of the same within a dark room.

The upper film compartment 10 is shown as being divided into two separate compartments by means of a wall 9 to house a negative or printing film reel 13 and a positive or sensitized film reel 14. The lower film compartment 12 is shown as being similarly divided to house a negative reel 15 and a positive reel 16. Due to the fact that the printing apparatus is reversible in direction the reels 13, 14 and 15, 16 are adapted to alternately become supply or takeup reels, depending upon the direction of the film through the printing compartment 11. Each of the film reels comprises a hub 19 on which the film is wound and a rear circular flange 20.

The film path of the film from the reel 13 to the reel 14, and from the reel 15 to the reel 16 is shown as it passes through compartment 11, one printing optical system being shown at 65, and another at 83.

As the details of this film drive are fully described in the above-mentioned parent application, and since it does not form part of the present invention, the description thereof will be eliminated for purposes of clarity. It is to be noted, however, that each reel is positively driven by chains 35, 138, 140 and 141 from a motor and that reversing the direction of rotation of the motor reverses the rotation of the elements driven by the chains. It is to be understood, of course, that reversal of the chains might also be effected by a reversing gear shift without a motor reversal.

Figure 2:
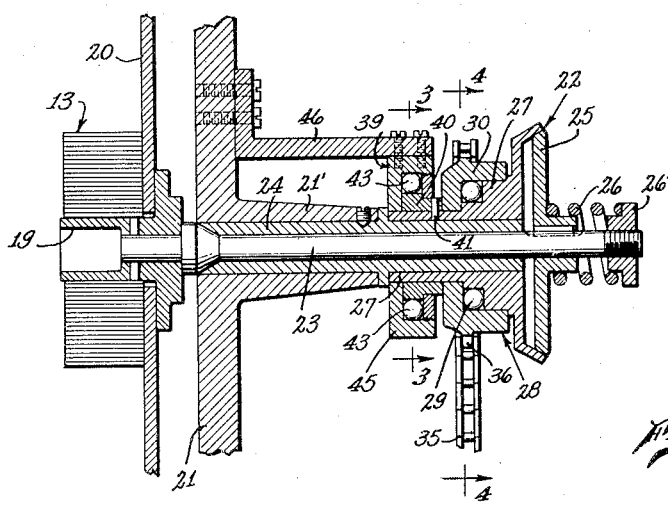
Figure 2 is an enlarged sectional view through the takeup mechanism for one of the film reels and is taken along the line 2—2 of Fig. 1.
Figures 3, 4:
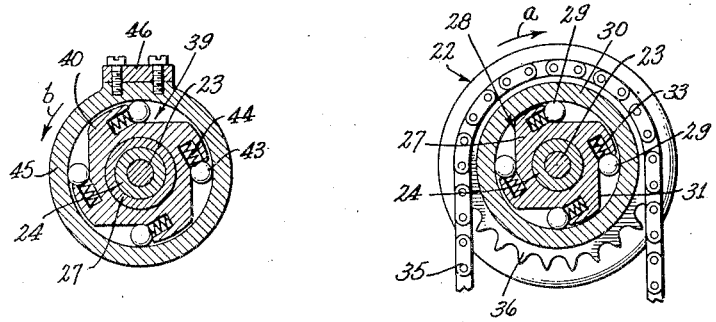
Figure 3 is a transverse sectional view taken along the line 3—3 of Fig. 2.
Figure 4 is a similar transverse sectional view taken along the line 4—4 of Fig. 2.

Referring now to Figs. 2 to 4, inclusive, wherein the details of the mechanism of reel 13 are shown, the mechanism for the other reels being the same, reel 13 is secured to a takeup mechanism generally indicated at 22. The hub 19 and flange 20 are secured to a shaft 23, which is journaled in a sleeve member 24. Sleeve member 24 is held in an apertured boss 21' formed at the rear of the wall 21 of the compartment 10. A friction member 25 slidably keyed for longitudinal adjusting movement on the outer end of the shaft 23 is resiliently urged by means of a spring 26, and nut 26', which is threadably secured upon the outer end of shaft 23, toward a cooperating friction member 27. The friction member 27 is journaled upon the outer surface of sleeve 24 and has an overrunning clutch mechanism generally indicated at 28, provided thereon. This overrunning clutch mechanism comprises a series of balls 29 (Fig. 4) which are held between an outer sleeve member 30 and wedge forming grooves 31 on the member 27, so formed that they are adapted to wedge the balls 29 against the inner surface of member 30. Springs 33 resiliently engaging the balls 29 tend to wedge the same against outer sleeve member 30.

When the film reel shown in Fig. 2 serves as a takeup reel the assembly is driven by means of a chain 35 which in turn is driven through a sprocket connected to the driving mechanism. Chain 35 engages a set of chain sprocket teeth 36, formed on the sleeve member 30. When the chain 35 is driven in the direction of the arrow a, (Fig. 4), corresponding to the direction of rotation when reel 13 is employed as a takeup reel, the balls 29 tend to wedge between the grooves 31 and the inner surface of member 30, thus driving friction member 27 and causing member 25 to drive the film reel 13. The friction adjusting nut 26' is so adjusted that a certain amount of slippage will occur between the members 25 and 27 to allow for compensation of the change in speed of the shaft 23 due to an increasing diameter of the film roll upon the hub 19.

A second overrunning clutch mechanism 39 is also attached to the member 27 and comprises a wedge forming member 40 which is suitably secured to an extending sleeve portion formed on the member 27 by means of a pin 41. Balls 43, springs 44 and an outer sleeve member 45 perform the same function as the balls 29, springs 33 and sleeve member 30 of Fig. 4. The sleeve member 45 is secured by means of a bracket 46 to the wall 21. When the reel in Fig. 2 acts as a supply reel, thus rotating in the direction of arrow b, (Fig. 3), the balls 43 become effective to prevent rotation of the friction member 27; thus the friction between members 25 and 27 prevents overrunning of the film reel.

To further explain the operation of this clutch mechanism let us assume that the reel 13 is to act as a takeup reel. In that case the sprocket 36 will be rotated as shown by the arrow a in Fig. 4, thus rotating the member 30 in a clockwise direction to carry the balls 29 forward along the surface 31 to lock the member 27 to the member 30. The member 30 will now drive the member 27 and the member 25 attached to the shaft 23 to rotate the hub 19 and take up the film, slippage occurring between elements 25 and 27 in accordance with the diameter of the reel. Member 27, of course, also freely rotates with element 40 within member 45 inasmuch as the balls 43 are urged backward toward the springs 44, consequently, there being no locking action.

Now let us assume that the motion is reversed so that the chain 35 drives the sprocket 36 in the opposite direction to that shown by the arrow a in Fig. 4. In that case the element 30 will be driven by the chain 35 and at the same time the film from the reel 13 will rotate the shaft 23 and member 25 in an anti-clockwise direction. In other words, both the member 30 and the member 25 will be driven in the same direction but at different speeds according to the size of the reel 13. Should the element 30 be traveling faster than the element 27, there is no tendency to drive element 27 since the balls 29 are pressed against the springs 33 and no connection is made between elements 27 and 30. However, rotation of member 25 by the film does tend to move member 27 in an anti-clockwise direction, but member 27 is prevented from so rotating by the balls 43 being urged into the narrow portion of their slots to lock the element 27 to the stationary collar 45 through element 40. Thus a drag is placed on the reel as the film is taken therefrom. In this manner, therefore, it is seen that the motion of the drive of the film may be reversed and any reel may become either a takeup or a supply reel, with the friction between elements 27 and 25, providing the necessary slippage to compensate for variations in the diameter of the reel when used as a takeup, and to introduce the necessary drag on the reel when used as a supply reel.

What is claimed is:

1. A film printing apparatus for printing one film from another film, comprising driving means, a rotatable shaft, adapted to be driven by said driving means, a combination takeup and supply reel for one of said films and mounted on one end of said rotatable shaft, an overrunning clutch operatively connected between said reel and said driving means when said reel functions as a takeup reel, a friction operated coupling device mounted adjacent the other end of said rotatable shaft and interconnecting said clutch and said reel, said clutch being adapted to rotate said friction device in one direction only, means for causing said friction device to produce a frictional drag on said reel when said reel functions as a supply reel, and means at the other end of said rotatable shaft adjacent said friction device for adjusting the tension thereof.

2. A film reel drive mechanism comprising a rotatable shaft having a film reel hub at one end thereof and a friction member mounted on the other end thereof, a positively driven member mounted concentrically with said shaft and intermediate said hub and said friction member, a second friction member interposed between said first friction member and said positively driven member, and means on the end of said rotatable shaft for adjusting the pressure between said friction members, means interposed between said second friction member and said positively driven member for connecting said positively driven member with said second friction member when said positively driven member is driven in one direction, and for disconnecting said positively driven member from said second friction member when said positively driven member is driven in the other direction, and additional means partially mounted on said second friction member and partially fixed with respect thereto for maintaining said second friction member stationary when rotation thereof is attempted in said other direction.

3. A film reel drive mechanism comprising a fixed member, a rotatable shaft having a film reel hub mounted on one end thereof, a friction member mounted adjacent the other end of said rotatable shaft and adapted to be rotated therewith, a quill concentric with said shaft, a second friction member in cooperative relation with said first friction member and mounted intermediate said reel hub and said first friction member for rotation on said quill, means on said other end of said rotatable shaft adjacent said first friction member for adjusting the pressure between said friction members, a positively driven member mounted concentric with said second friction member, means interposed between said second friction member and said positively driven member for connecting said second friction member with said positively driven member when said positively driven member is rotated in a certain direction, said means adapted to disconnect said positively driven member and said second friction member when said positively driven member is rotated in the opposite direction, and means similar to said last-mentioned interposed means and mounted intermediate said fixed member and said second friction member for interlocking said fixed member and said second friction member when rotation thereof is attempted in said opposite direction.

4. A film reel drive in accordance with claim 3 in which said means interposed between said positively driven member and said second friction member and between said fixed member and said second friction member includes a series of balls in respective slots of said interposed means, positive connection adapted to be made between members contacted by said balls when said balls are in one position in said slots, and said members being disconnected when said balls are in another position in said slots.

5. A motion picture film reel operating device comprising a rotatable shaft having a film reel mounted at one end thereof and a friction member at the other end thereof, a support for said shaft, a second friction member mounted concentrically and rotatably with respect to said shaft, an overrunning clutch mounted on said second friction member for driving said friction member in one direction only, and a second overrunning clutch having a portion thereof mounted on said second friction member, and another portion thereof fixedly attached to said support for said shaft.

6. A film reel drive mechanism comprising a rotatable shaft having a film reel hub mounted on one end thereof, a friction member mounted adjacent the other end of said shaft and adapted to be rotated therewith, a rotatable member mounted concentrically with said shaft and adapted to be positively driven, a member interposed between said positively driven member and said friction member, said last-mentioned member cooperating with said friction member through friction contact and adapted to be positively driven by said positively driven member when moved in one direction and to be disconnected from said positively driven member when said positively driven member is driven in the other direction, and means partially mounted on said interposed member and partially fixed with respect thereto for maintaining said interposed member stationary when rotation thereof is attempted in said other direction.

ERNEST ROSS.